(12) United States Patent
Sato et al.

(10) Patent No.: US 8,624,830 B2
(45) Date of Patent: Jan. 7, 2014

(54) DISPLAY DEVICE WITH ARRANGEMENT TO REDUCE FLUCTUATIONS IN BRIGHTNESS OF PIXELS CAUSED BY PARASITIC CAPACITANCE

(75) Inventors: Takao Sato, Mobara (JP); Takeshi Sato, Kokubunji (JP)

(73) Assignees: Hitachi Displays, Ltd., Chiba (JP); Panasonic Liquid Crystal Display Co., Ltd., Hyogo (JP)

( * ) Notice: Subject to any disclaimer, the term of this patent is extended or adjusted under 35 U.S.C. 154(b) by 59 days.

(21) Appl. No.: 13/217,314

(22) Filed: Aug. 25, 2011

(65) Prior Publication Data

US 2012/0050150 A1 Mar. 1, 2012

(30) Foreign Application Priority Data

Aug. 30, 2010 (JP) ................................ 2010-191720

(51) Int. Cl.
*G09G 3/36* (2006.01)
*G02F 1/1333* (2006.01)

(52) U.S. Cl.
USPC .................. 345/103; 345/87; 349/40; 349/54

(58) Field of Classification Search
USPC .................... 349/32, 39, 40, 54; 345/90, 204; 174/260
See application file for complete search history.

(56) References Cited

U.S. PATENT DOCUMENTS

| | | | | |
|---|---|---|---|---|
| 6,005,543 A | * | 12/1999 | Kimura | 345/94 |
| 6,122,022 A | * | 9/2000 | Hayakawa | 349/32 |
| 6,292,237 B1 | * | 9/2001 | Hebiguchi | 349/39 |
| 6,384,878 B1 | * | 5/2002 | Kwak | 349/40 |
| 6,608,655 B2 | * | 8/2003 | Matoba et al. | 349/54 |
| 6,717,630 B1 | | 4/2004 | Ikeda | |
| 7,079,100 B2 | * | 7/2006 | Miyajima et al. | 345/90 |
| 7,403,193 B2 | * | 7/2008 | Ootsu et al. | 345/204 |
| 7,570,339 B2 | * | 8/2009 | Kadotani et al. | 349/156 |
| 2009/0262054 A1 | * | 10/2009 | Hsu et al. | 345/87 |
| 2010/0320472 A1 | * | 12/2010 | Liu | 257/59 |
| 2013/0048362 A1 | * | 2/2013 | Kuroda | 174/260 |

FOREIGN PATENT DOCUMENTS

| | | | | |
|---|---|---|---|---|
| CN | 101561596 A | | 10/2009 | |
| JP | 5-80353 | | 4/1993 | |
| JP | 2000-35589 | | 2/2000 | |
| JP | 2003270655 A | * | 9/2003 | ............ G02F 1/1343 |
| JP | 2006146277 A | * | 6/2006 | |
| JP | 2008256753 A | * | 10/2008 | |
| KR | 2004055250 A | * | 6/2004 | |

* cited by examiner

*Primary Examiner* — Dwayne Bost
*Assistant Examiner* — Darlene M Ritchie
(74) *Attorney, Agent, or Firm* — Antonelli, Terry, Stout & Kraus, LLP.

(57) ABSTRACT

Provided is a display device (1), including: two pixels in a region (A) surrounded by two video signal lines (DL) and two scanning signal lines (GL); a first dummy wiring, which is connected to one video signal line of the two video signal lines; and a second dummy wiring, which is connected to a different one of the two video signal lines (DL) from the one video signal line to which the first dummy wiring is connected, in which the first dummy wiring and the second dummy wiring each extend along a contour of the region (A) to a position between the two pixels, and further extend so that respective end portions are opposed to each other between the two pixels.

7 Claims, 6 Drawing Sheets

DISPLAY DEVICE WITH ARRANGEMENT TO REDUCE FLUCTUATIONS IN BRIGHTNESS OF PIXELS CAUSED BY PARASITIC CAPACITANCE

CROSS-REFERENCE TO RELATED APPLICATION

The present application claims priority from Japanese application JP 2010-191720 filed on Aug. 30, 2010, the content of which is hereby incorporated by reference into this application.

BACKGROUND OF THE INVENTION

1. Field of the Invention

The present invention relates to a display device including two pixel electrodes forming two pixels in a region surrounded by two video signal lines and two scanning signal lines.

2. Description of the Related Art

Conventionally, there has been a problem that it becomes more difficult to downsize a display device as the number of video signal lines increases. In light of the problem, a display device capable of driving each pixel by using a small number of video signal lines has been proposed (see, for example, Japanese Patent Application Laid-open No. 2000-35589). The display device described in Japanese Patent Application Laid-open No. 2000-35589 includes two pixel electrodes forming two pixels in a region surrounded by two video signal lines and two scanning signal lines.

SUMMARY OF THE INVENTION

By the way, a parasitic capacitance Cds exists between the video signal line and the pixel electrode, and the potential of the pixel electrode is affected by the potential of the video signal line via the parasitic capacitance Cds. The potential of the pixel electrode is more affected by the potential of the video signal line as the parasitic capacitance Cds has a larger value. The value of the parasitic capacitance Cds becomes larger as the distance between the pixel electrode and the video signal line is smaller. Accordingly, as the distance between the pixel electrode and the video signal line becomes smaller, the potential of the pixel electrode is more affected by the potential of the video signal line. Countermeasures are therefore taken to prevent the potential of the video signal line from affecting the potential of the pixel electrode, such as providing a distance between the pixel electrode and the video signal line.

The display device of Japanese Patent Application Laid-open No. 2000-35589, however, has the following problem. As illustrated in FIGS. 6A and 6B, if two pixel electrodes Px1 and Px2 respectively forming two pixels D1 and D2 are displaced in the X-direction with respect to video signal lines DL due to displacement occurring during patterning, the two pixel electrodes Px1 and Px2 have different distances from an adjacent video signal line DL (see FIG. 6B) and are therefore affected by the potential of the video signal line DL to different degrees. Consequently, fluctuations in brightness of pixels occur. Here, the thickness of the arrows in FIGS. 6A and 6B represents the degrees to which the potentials of the pixel electrodes Px1 and Px2 are affected by the potential of the video signal line DL, and a thicker arrow indicates that the potential is affected to a higher degree.

The present invention has been made in view of the above-mentioned circumstances, and it is an object thereof to provide a display device capable of reducing fluctuations in brightness of pixels.

In order to solve the above-mentioned problem and achieve the object, a display device according to the present invention includes: two pixel electrodes respectively forming two pixels in a region surrounded by two video signal lines and two scanning signal lines; a first dummy wiring, which is connected to one video signal line of the two video signal lines; and a second dummy wiring, which is connected to a different one of the two video signal lines from the one video signal line to which the first dummy wiring is connected, in which the first dummy wiring and the second dummy wiring each extend along a contour of the region to a position between the two pixel electrodes, and further extend to a position at which respective end portions are closely opposed to each other between the two pixel electrodes.

Further, in the above-mentioned display device according to the present invention, the first dummy wiring and the second dummy wiring may each extend to a substantially central position of the two pixel electrodes in an extending direction of the two video signal lines.

Further, in the above-mentioned display device according to the present invention, the first dummy wiring and the second dummy wiring may be formed so that the end portion of the first dummy wiring and the end portion of the second dummy wiring are overlapped with each other in a direction of rubbing treatment.

Further, in the above-mentioned display device according to the present invention: the end portion of the first dummy wiring and the end portion of the second dummy wiring may be formed to be inclined at the same inclination angle; and the first dummy wiring and the second dummy wiring may be arranged so that inclined portions of the end portions are opposed to each other.

Further, in the above-mentioned display device according to the present invention, the first dummy wiring and the second dummy wiring may each have the same width as a width of each of the two video signal lines.

According to the display device of the present invention, when the pixel electrodes are displaced with respect to the video signal lines and the pixel electrodes are positioned away from an adjacent video signal line, the pixel electrodes are positioned closer to the first dummy wiring and the second dummy wiring, and when the pixel electrodes are positioned closer to the adjacent video signal line, the pixel electrodes are positioned away from the first dummy wiring and the second dummy wiring. Therefore, the degrees to which the potentials of the pixel electrodes are affected by the potentials of the video signal lines DL can be averaged, with the result that the fluctuations in brightness of pixels can be reduced.

DETAILED DESCRIPTION OF THE INVENTION

Hereinafter, referring to the accompanying drawings, a display device according to an exemplary embodiment of the present invention is described in detail. Note that, the present invention is not intended to be limited by the embodiment.

Embodiment

Figure 1:
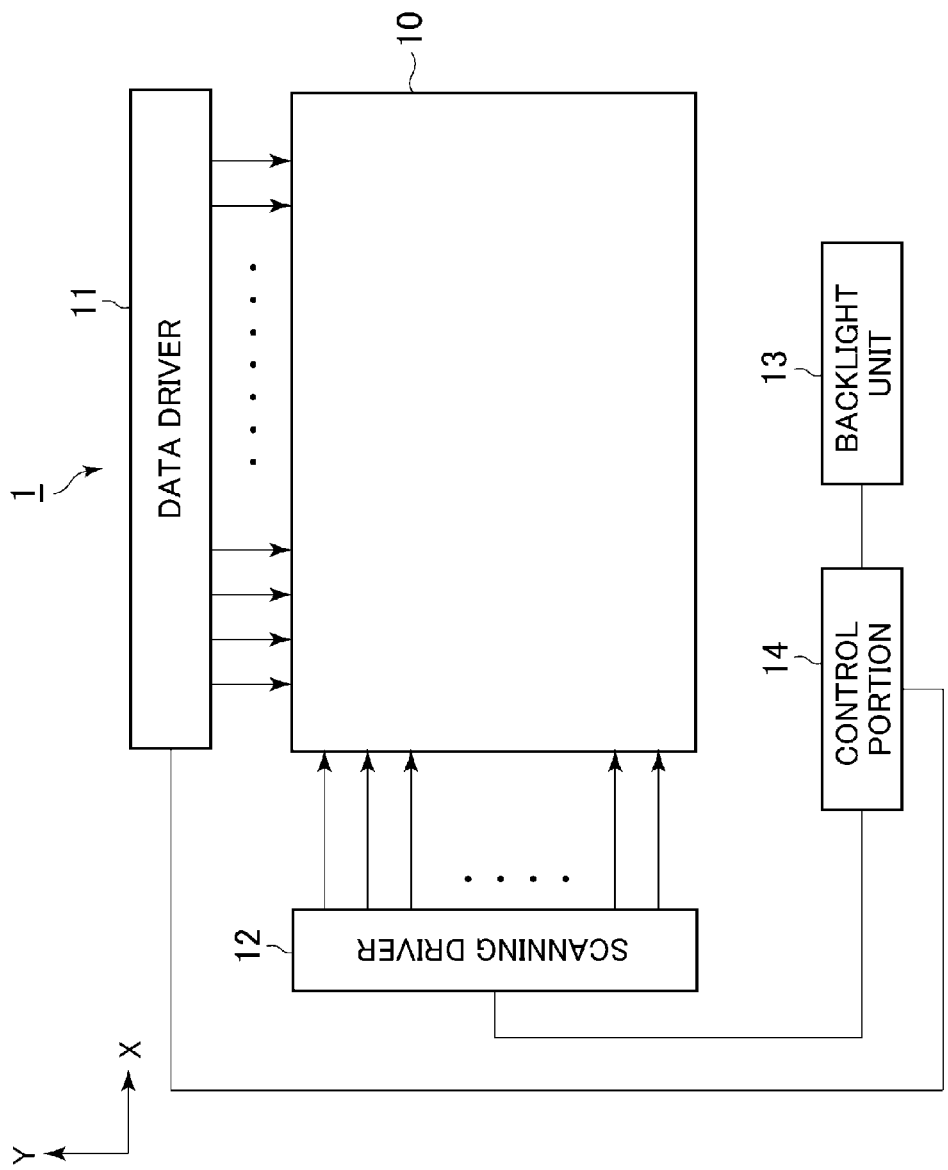
FIG. 1 is a schematic diagram illustrating a configuration of a liquid crystal display device according to an embodiment of the present invention.
Figure 2:
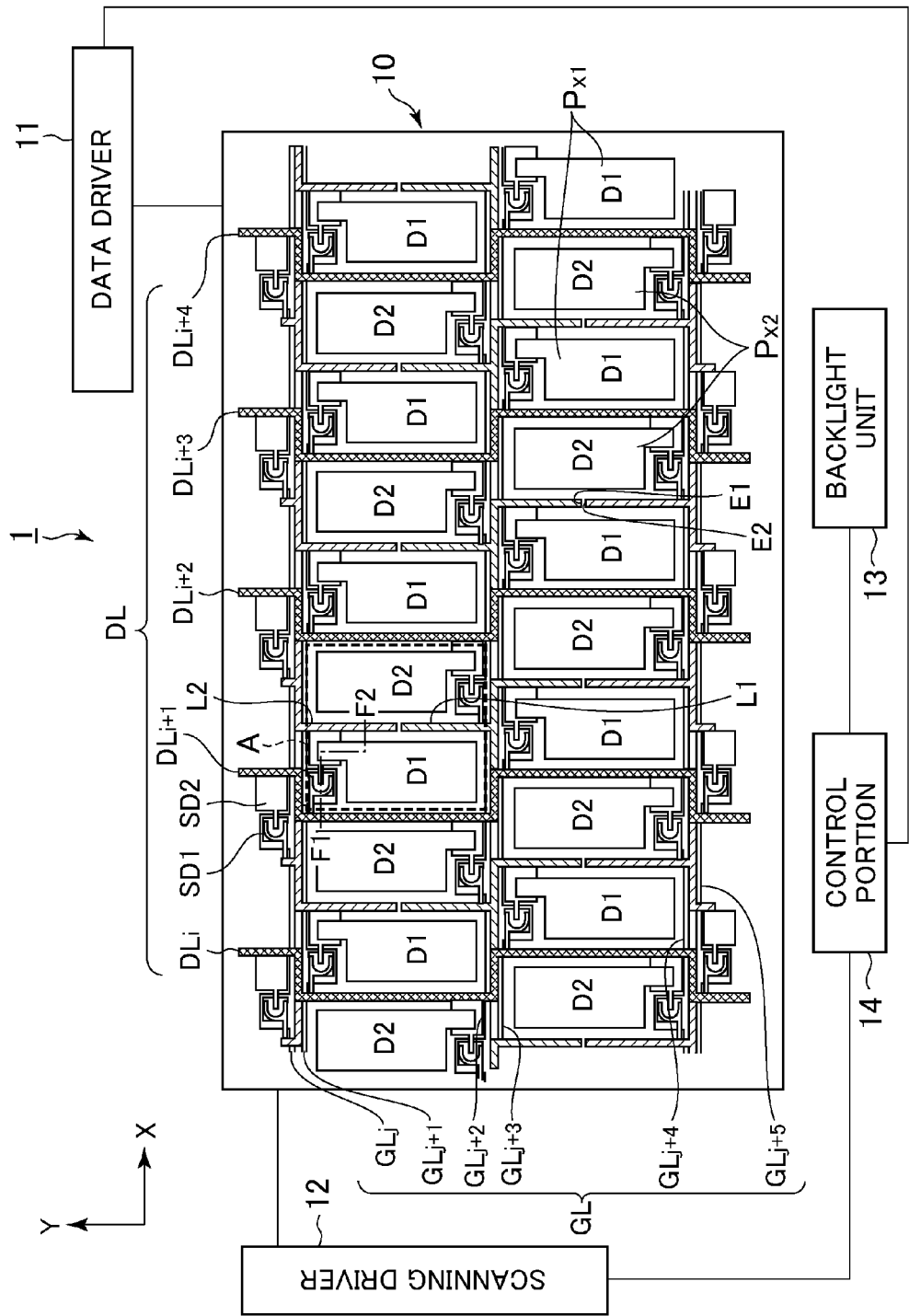
FIG. 2 is a diagram illustrating a detailed configuration of a liquid crystal display panel illustrated in FIG. 1.
Figure 3:
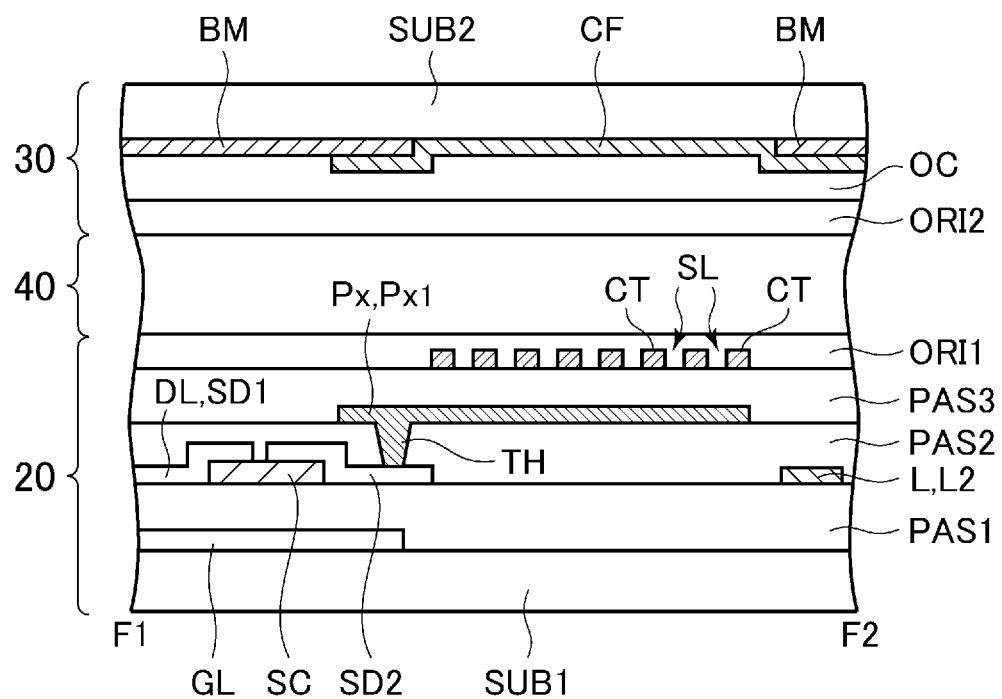
FIG. 3 is a schematic cross-sectional view taken along the line F1-F2 of the liquid crystal display panel illustrated in FIG. 2.

FIG. 1 is a schematic diagram illustrating a configuration of a liquid crystal display device 1 according to the embodiment of the present invention. FIG. 2 is a diagram illustrating a detailed configuration of a liquid crystal display panel 10 illustrated in FIG. 1. FIG. 3 is a schematic cross-sectional view taken along the line F1-F2 of the liquid crystal display panel 10 illustrated in FIG. 2. The liquid crystal display device 1 employs a lateral driving mode called in-plane switching (IPS), and includes, as illustrated in FIGS. 1 and 2, the liquid crystal display panel 10, a data driver 11, a scanning driver 12, a backlight unit 13, and a control portion 14.

Referring to FIG. 2, the liquid crystal display panel 10 includes a plurality of video signal lines DL ($DL_1$, ..., DLi, ..., DLn: where i and n are natural numbers) extending in the Y-direction and a plurality of scanning signal lines GL ($GL_1$, ..., GLj, ..., GLm: where j and m are natural numbers) extending in the X-direction. Further, in the liquid crystal display panel 10, the plurality of scanning signal lines GL are formed and arranged in parallel to each other, whereas the plurality of video signal lines DL are formed in zigzag. In other words, pixels D (a pixel D1 and a pixel D2) are disposed in delta arrangement. In the liquid crystal display panel 10, two adjacent pixels D1 and D2 arranged in an extending direction of the scanning signal lines GL (X-direction) are paired, and the video signal line DL is disposed for each of the pairs of pixels D1 and D2. The liquid crystal display panel 10 employs a double scanning line type, in which two scanning signal lines GL are disposed between two pixels adjacent in an extending direction of the video signal lines DL (Y-direction).

The data driver 11 generates an image signal (gray-scale voltage) to be input to each of the plurality of video signal lines DL.

The scanning driver 12 sequentially inputs scanning signals to the plurality of scanning signal lines GL. The data driver 11 and the scanning driver 12 are electrically connected to the liquid crystal display panel 10 via flexible boards or the like (not shown) which are connected to a peripheral portion of the liquid crystal display panel 10.

The backlight unit 13 is realized by light emitting diodes or the like, and irradiates the liquid crystal display panel 10 with light from the rear surface side.

The control portion 14 is realized by a CPU or the like, and is electrically connected to the respective portions of the liquid crystal display device 1 including the data driver 11, the scanning driver 12, and the backlight unit 13, to thereby control the entire operation of the liquid crystal display device 1. Further, the control portion 14 includes a memory (not shown) or the like for temporarily holding image data input from an external system.

Now, referring to FIGS. 2 and 3, the liquid crystal display panel 10 is described in detail. Referring to FIG. 3, the liquid crystal display panel 10 has a liquid crystal material 40 sealed between a TFT substrate 20 and a counter substrate 30. In the TFT substrate 20, the scanning signal lines GL are provided on an insulating substrate SUB1 such as a glass substrate. The scanning signal lines GL are formed by, for example, subjecting a conductive film such as aluminum to etching.

Above the scanning signal line GL, a semiconductor layer SC, the video signal line DL (drain electrode SD1), a source electrode SD2, and dummy wirings L (dummy wirings L1 and L2) are provided through the intermediation of a first insulating layer PAS1.

The semiconductor layer SC is shaped by, for example, subjecting an amorphous silicon film to etching and then implanting impurities in a drain region and a source region. The drain electrode SD1 is electrically connected to the video signal line DL, and is formed by, for example, branching a part of the video signal line DL. The drain electrode SD1 having a U-shape in plan view as illustrated in FIG. 2 is exemplified, but the shape is not limited thereto and, for example, a linear shape may be employed.

Above the video signal line DL, a pixel electrode Px is provided through the intermediation of a second insulating layer PAS2. The pixel electrode Px is formed by etching a high light transmission rate conductive film, such as ITO, and is connected to the source electrode SD2 via a through-hole TH. Further, the pixel electrode Px is formed into a flat shape in a region overlapping a counter electrode CT in plan view. Above the pixel electrode Px, the counter electrode CT is provided through the intermediation of a third insulating layer PAS3.

The counter electrode CT is formed by etching a high light transmission rate conductive film, such as ITO. The counter electrode CT is formed into a comb shape having a plurality of slits SL in a region overlapping the pixel electrode Px in plan view. An orientation film ORI1 is provided over the counter electrode CT.

In the counter substrate 30, a light shielding film BM called black matrix and a color filter CF are provided on the surface of an insulating substrate SUB2 such as a glass substrate. The light shielding film BM is formed by, for example, subjecting a conductive film or an insulating film having a light transmission rate of almost zero to etching to be patterned into such a grid that separates the respective pixels D. The color filter CF is formed by, for example, forming an insulating film by etching or exposure/development and forming a filter serving as red (R) display, a filter serving as green (G) display, and a filter serving as blue (B) display in an opening region of the light shielding film in a periodic array. Further, above the light shielding film BM and the color filter CF, for example, an orientation film ORI2 is provided through the intermediation of an overcoat layer OC.

Here, referring to FIG. 2, the liquid crystal display panel 10 includes two pixel electrodes Px1 and Px2 respectively forming two pixels D1 and D2 in a region A surrounded by two video signal lines $DL_{i+1}$ and $DL_{i+2}$ and two scanning signal lines $GL_{j+1}$ and $GL_{j+2}$. The liquid crystal display panel 10 further includes the dummy wirings L1 and L2.

The dummy wiring L1 is connected, as a first dummy wiring, to one video signal line $DL_{i+1}$ of the two video signal lines $DL_{i+1}$ and $DL_{i+2}$. The dummy wiring L2 is connected, as a second dummy wiring, to a different one of the two video signal lines $DL_{i+1}$ and $DL_{i+2}$ from the video signal line to which the dummy wiring L1 is connected, that is, to the video signal line $DL_{i+2}$. The dummy wirings L1 and L2 each extend along the contour of the region A (along the scanning signal lines GL) to a position between the two pixel electrodes Px1 and Px2, and further extend to a position at which respective end portions E1 and E2 are closely opposed to each other between the two pixel electrodes Px1 and Px2. The dummy wirings L1 and L2 each bend from a portion thereof extending in the X-direction along the contour of the region A and extend between the two pixel electrodes Px1 and Px2 so that the end portions E1 and E2 are opposed to each other. The end portions E1 and E2 are each shaped to be cut perpendicularly to an extending direction of the dummy wirings L1 and L2. Further, the dummy wirings L1 and L2 each extend to a substantially central position in the Y-direction of the two pixel electrodes Px1 and Px2 between the two pixel electrodes Px1 and Px2, that is, a substantially central position of the two pixel electrodes Px1 and Px2 in the extending direction of the video signal line DL. Still further, the dummy wirings L1 and L2 each have substantially the same width as that of the video signal line DL.

Figure 4:
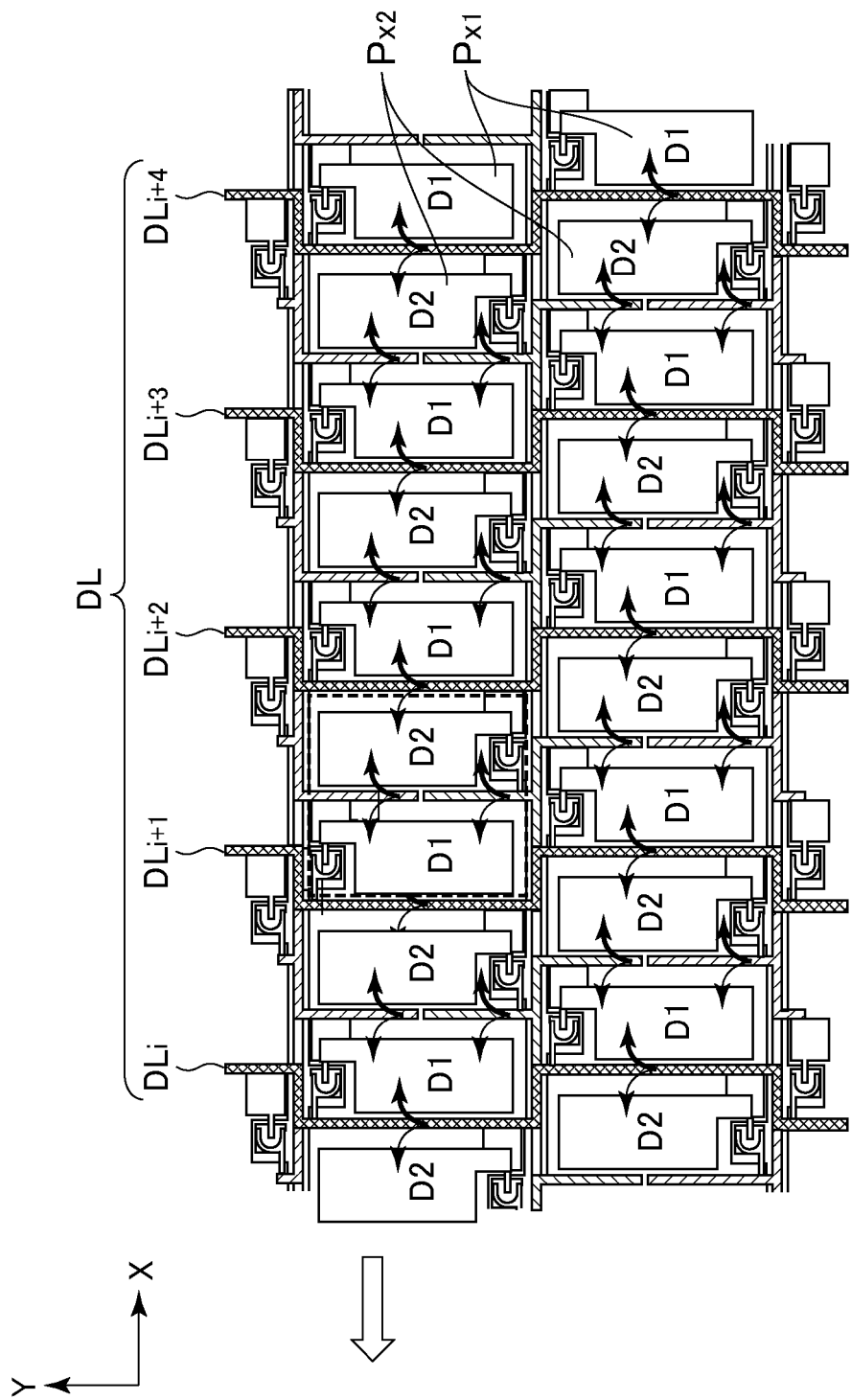
FIG. 4 is a diagram illustrating a state in which pixel electrodes are displaced with respect to video signal lines.

With the dummy wirings L1 and L2 provided in this way, as illustrated in FIG. 4, even if the pixels D are displaced in the X-direction with respect to the video signal lines DL due to displacement when patterning is performed, the pixel electrodes Px1 and Px2 are positioned closer to the dummy wiring L1 and the dummy wiring L2 when the pixel electrodes Px1 and Px2 are positioned away from an adjacent video signal line DL, while the pixel electrodes Px1 and Px2 are positioned away from the dummy wiring L1 and the dummy wiring L2 when the pixel electrodes Px1 and Px2 are positioned closer to the adjacent video signal line DL. Therefore, the degrees to which the potentials of the video signal lines DL and the dummy wirings L1 and L2 affect the potentials of the pixel electrodes Px1 and Px2 are averaged. In other words, by providing the dummy wirings L1 and L2, the degrees to which the potentials of the video signal lines DL affect the potentials of the pixel electrodes Px1 and Px2 are averaged.

In this embodiment, in the liquid crystal display device 1, when the pixel electrodes Px1 and Px2 are displaced with respect to the video signal lines DL and the pixel electrodes Px1 and Px2 are positioned away from an adjacent video signal line DL, the pixel electrodes Px1 and Px2 are positioned closer to the dummy wiring L1 and the dummy wiring L2, and when the pixel electrodes Px1 and Px2 are positioned closer to the adjacent video signal line DL, the pixel electrodes Px1 and Px2 are positioned away from the dummy wiring L1 and the dummy wiring L2. Therefore, the degrees to which the potentials of the pixel electrodes Px1 and Px2 are affected by the potentials of the video signal lines DL can be averaged, with the result that the fluctuations in brightness of the pixels D can be reduced.

Further, in the embodiment of the present invention, the dummy wirings L1 and L2 each extend to a substantially central position of the two pixel electrodes Px1 and Px2 in the extending direction of the video signal lines DL, and hence even when adjacent video signal lines DL have different voltages, the degrees to which the potentials of the pixel electrodes Px are affected by the potentials of the video signal lines DL can be averaged.

Still further, in this embodiment, the dummy wirings L1 and L2 each have substantially the same width as that of the video signal line DL, and hence the pixel electrodes Px are affected by the potentials of the dummy wirings L1 and L2 equivalently to the potentials of the video signal lines DL. This way, the degrees to which the potentials of the pixel electrodes Px are affected by the potentials of the video signal lines DL can be further averaged.

Modified Example

Figure 5A:
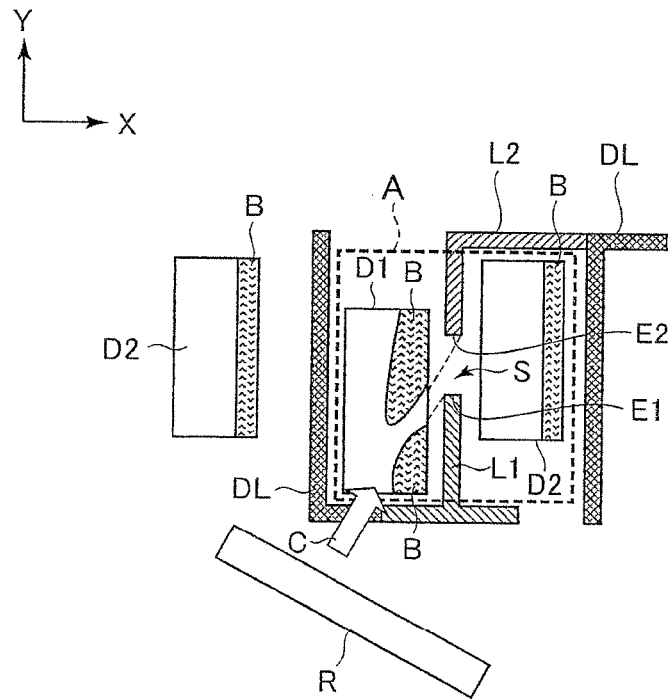
FIG. 5A is a diagram illustrating the shape of end portions of dummy wirings according to the embodiment illustrated in FIG. 2.
Figure 5B:
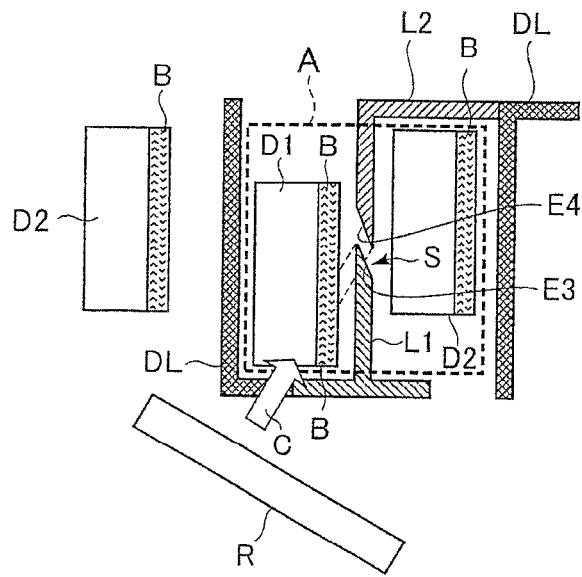
FIG. 5B is a diagram illustrating the shape of end portions of the dummy wirings according to a modified example of the embodiment of the present invention.
Figure 6A:
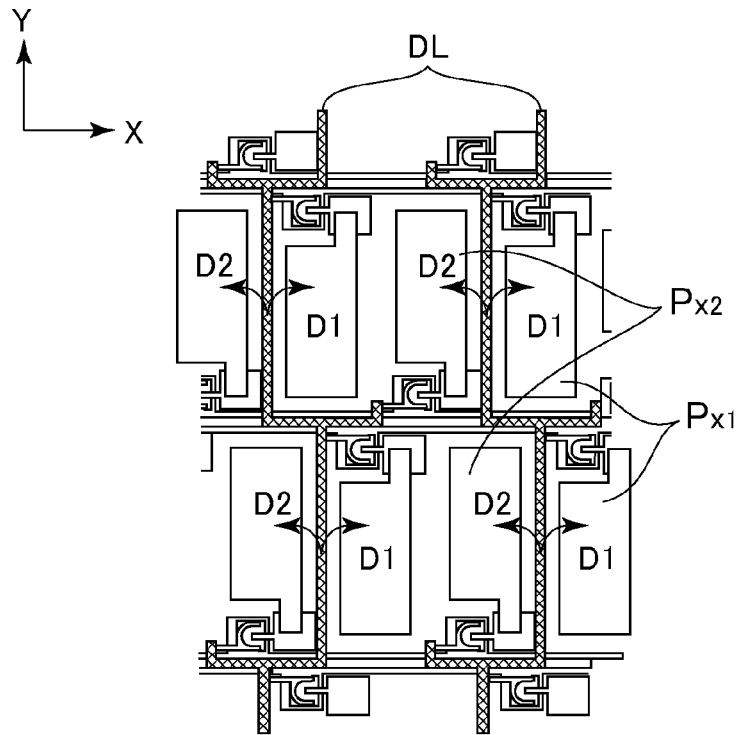
FIG. 6A is a diagram illustrating the degrees to which the potentials of the pixel electrodes are affected by the potentials of the video signal lines.
Figure 6B:
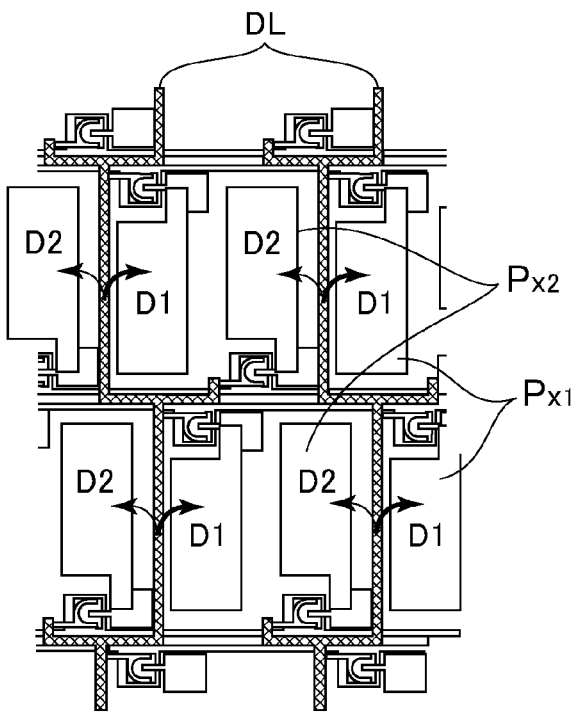
FIG. 6B is a diagram illustrating the degrees to which the potentials of the pixel electrodes are affected by the potentials of the video signal lines, illustrating a state in which the pixel electrodes are displaced with respect to the video signal lines in patterning.

Next, a modified example of the above-mentioned embodiment is described with reference to FIGS. 5A and 5B. FIG. 5A is a diagram illustrating the shape of the end portions of the dummy wirings according to the above-mentioned embodiment, and FIG. 5B is a diagram illustrating the modified example of the above-mentioned embodiment. The above-mentioned embodiment has exemplified the end portions of the dummy wirings L1 and L2, each of which is shaped to be cut perpendicularly to the extending direction of the dummy wirings L1 and L2 (see FIG. 5A). In this modified example, however, the end portions of the dummy wirings L1 and L2 are formed to be inclined at the same inclination angle so that the tips of the end portions are sharpened. Then, an end portion E3 of the dummy wiring L1 and an end portion E4 of the dummy wiring L2 are overlapped with each other so that a cross section in the direction (X-direction) perpendicular to the extending direction of the dummy wirings L1 and L2 (Y-direction), which includes both the end portion E3 and the end portion E4, is present (see FIG. 5B).

More specifically, the dummy wiring L1 and the dummy wiring L2 are arranged so that inclined portions of the end portions are opposed to each other, in which the dummy wiring L1 extends farther beyond the position of the tip of the end portion E4 of the dummy wiring L2, and the tip of the end portion E3 is formed at a position closer to a portion of the dummy wiring L2 which extends along the contour of the region A with respect to the tip of the end portion E4. Then, in this arrangement, the end portion E3 of the dummy wiring L1 and the end portion E4 of the dummy wiring L2 are overlapped with each other in the direction C of rubbing treatment carried out by a rubbing roller R. Specifically, both the end portion E3 and the end portion E4 are included in the cross-section at a predetermined position in the direction C of rubbing treatment, and the inclination angles of the end portions E3 and E4 are set so that the end portions E3 and E4 are inclined toward a direction of the rubbing roller R (direction perpendicular to the direction C of rubbing treatment) with reference to the direction (X-direction) perpendicular to the extending direction of the dummy wirings L1 and L2. In this case, the influence of a slit S, which is formed by providing the dummy wirings L1 and L2, can be reduced to a low level, with the result that light leakage B is comparable to that which is generated by a video signal line DL having no slit. Therefore, the state of the light leakage B can be made uniform to suppress the fluctuations in brightness consequently.

Note that, the above-mentioned embodiment and the modified example thereof have exemplified the dummy wirings L1 and L2 that have substantially the same width as that of the video signal line DL, but the present invention is not limited thereto. For example, the widths of the dummy wirings L1 and L2 may be smaller than the width of the video signal line DL.

Further, the above-mentioned embodiment and the modified example thereof have exemplified the liquid crystal display device 1 that employs the IPS mode, but the present invention is not limited thereto. In other words, the present invention is applicable to any display device that includes two pixel electrodes Px1 and Px2 respectively forming two pixels D1 and D2 in the region A surrounded by two video signal lines DL that are adjacent each other and two scanning signal lines GL that are adjacent each other. For example, the display device may be a liquid crystal display device of a vertical electric field type and may be an organic EL display device.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
   two pixel electrodes respectively forming two pixels in a region surrounded by two video signal lines adjacent to each other and two scanning signal lines adjacent to each other;
   a first dummy wiring, which is connected to one video signal line of the two video signal lines; and
   a second dummy wiring, which is connected to a different one of the two video signal lines from the one video signal line to which the first dummy wiring is connected,
   wherein the two pixel electrodes are arranged adjacent to each other between the two video signal lines in a direction in which the two scanning signal lines extend;
   wherein the first dummy wiring extends along one of the two scanning signal lines to a first position adjacent an area between the two pixel electrodes, and the second dummy wiring extends along the other one of the two scanning signal lines to a second position adjacent the area between the two pixel electrodes; and
   wherein the first dummy wiring includes a first extending portion extending from the first position into the area between the two pixel electrodes and the second dummy wiring includes a second extending position extending from the second position into the area, between the two pixel electrodes, and wherein respective end portions of the first and second extending portions are opposed to each other in the area between the two pixel electrodes.

2. The display device according to claim 1, wherein the first extending portion and the second extending portion each extend to a substantially central position in the area between the two pixel electrodes in an extending direction of the two video signal lines.

3. The display device according to claim 1, wherein the first dummy wiring and the second dummy wiring each have the same width as a width of each of the two video signal lines.

4. The display device according to claim 1, wherein the first dummy wiring and the second dummy wiring are formed so that the end portion of the first extending portion and the end portion of the second extending portion are overlapped with each other in a direction of a rubbing treatment applied to the pixel electrodes.

5. The display device according to claim 4, wherein:
   the end portion of the first extending portion and the end portion of the second extending portion are formed to be inclined at the same inclination angle; and
   the first extending portion and the second extending portion are arranged so that inclined portions of the end portions are opposed to each other when viewed in a direction of the extension of the scanning signal lines.

6. The display device according to claim 1,
   wherein a slit is formed between the end portion of the first extending portion and the end portion of the second extending portion, the slit being formed in a shape inclined with reference to the direction in which the two scanning signal lines extend; and
   wherein the end portions of the first dummy wiring and the second dummy wiring are formed so that tips of the end portions are sharpened.

7. The display device according to claim 6,
   wherein the tip of the end portion of the first extending portion extends to a position closer to the other one of the two scanning signal lines than the tip of the end portion of the second extending portion; and
   wherein the tip of the end portion of the second extending portion extends to a position closer to the one of the two scanning signal lines than the tip of the end portion of the first extending portion.

* * * * *